J. J. GRAY.
Lock-Nut.
No. 159,508. Patented Feb. 9, 1875.
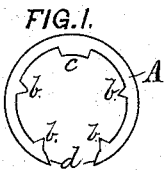
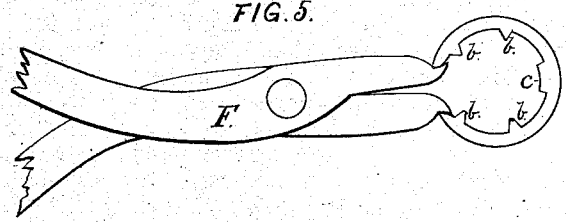
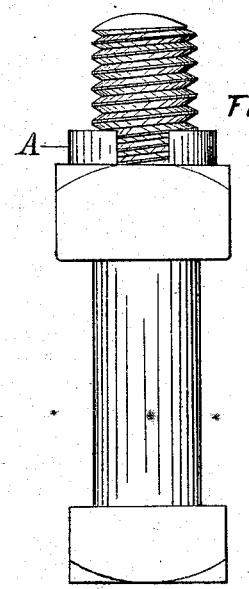
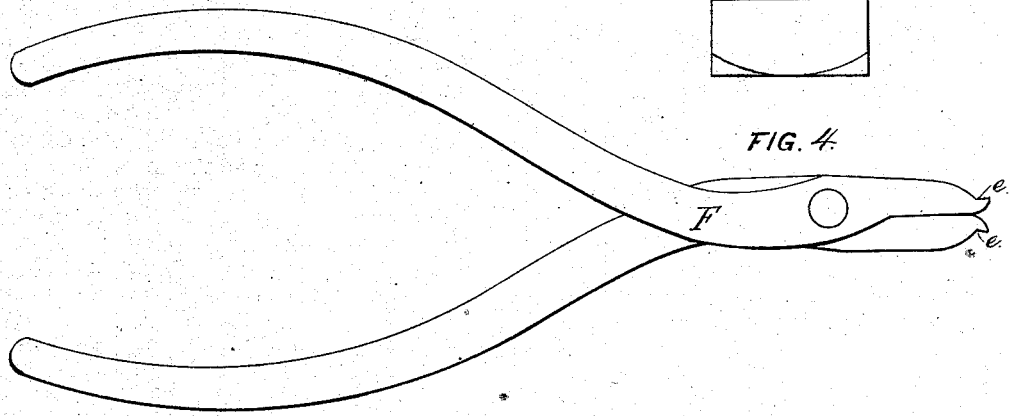
WITNESSES:
Geo. T. Smallwood, Jr.
John Roby.
INVENTOR.
John Joseph Gray
By John J. Halsted.
Attorney.

UNITED STATES PATENT OFFICE.

JOHN JOSEPH GRAY, OF BALTIMORE, MARYLAND, ASSIGNOR OF ONE-HALF HIS RIGHT TO GEORGE S. NORRIS, OF SAME PLACE.

IMPROVEMENT IN NUT-LOCKS.

Specification forming part of Letters Patent No. 159,508, dated February 9, 1875; application filed January 15, 1875.

*To all whom it may concern:*

Be it known that I, JOHN JOSEPH GRAY, of the city of Baltimore and State of Maryland, have invented new and useful Improvements in Lock-Nuts; and I do hereby declare that the following, taken in connection with the drawings which accompany and form part of this specification, is a description of this invention sufficient to enable those skilled in the art to practice it.

My improvement relates to a novel means for checking or locking a nut upon a screw; and it consists in a steel or tempered inclosing-ring, having peculiar teeth on its interior face, adapted to bite the screw, the powerful resilient quality of this open ring causing it to remain fixed in position when once sprung to its place on the screw, while at the same time it is readily applied or readily removed, when needed, by means of pliers adapted to the purpose.

In the drawings, Figure 1 is a plan or edge view of the ring; Fig. 2, a plan of the inside of the same twice the size of Fig. 1, the ring being spread out in a plane to display its teeth. Fig. 3 shows a bolt and nut with my improvement applied thereto. Fig. 4 is a plan view of the pliers, and Fig. 5 illustrates the manner of using the same to pry open the ring.

The bolt, the screw-thread thereon, and the nut are made in the ordinary manner, requiring no change whatever to adapt them for the application thereto of my improvement. The inclosed checking-ring, which I shall designate the check-piece, is shown at A. It is formed from a strip of iron or steel bent into the form of an incomplete circle of appropriate size, and provided with two or more small teeth, *b b*, projecting radially inward from the edge, and also with a longer tooth, *c*, of different character, also projecting radially inward, and placed, preferably, at that edge which is to abut against the nut. The teeth *b*, as will be seen, have sharp biting-edges in a direction transverse of the check-piece, and adapted to grasp the thread of the bolt crosswise, or to lodge crosswise in the groove between the threads, and in either case to gripe the bolt tightly and prevent its being turned thereon. The tooth *c* has its edge adapted to lie lengthwise in the groove of the bolt, and close up against the nut, which is to be locked by the check-piece, the length of this tooth and its position between two adjacent threads preventing the slipping or forcing of the check-piece away from the nut. Any of the teeth may be notched or serrated, if desired. It will now be seen that when made of a proper size adapted to that of the bolt this check-piece, when sprung upon the bolt, is as nearly as practicable immovable by any jars, jolts, or ordinary causes or accidents which tend to loosen nuts or nut-fastening devices heretofore used. It is applied by springing it a little open, and then passing it over the end of the bolt, and placing it close against the outer face of the nut, as shown in Fig. 1.

In order to facilitate this placing or removal of the check-piece, it is preferably beveled inward at its two ends, as shown at *d*, to receive the notched ends *e e* of the jaws of a pliers, F, which may be used for this purpose, the pliers being so made that pressure on its handles shall open the jaws and pry open the check-piece, so as to admit either of placing it on the bolt or of removing it therefrom.

The simplicity and efficiency of this novel check-piece is evident, and not the least of its advantages is, that it is applicable to all bolts in all kinds of engines, vehicles, machinery, or constructions where ordinary bolts and nuts are used, at a moment's notice, and without any alteration in either the nut or bolt. The check-piece is preferably tempered after it has been made and bent to shape.

I claim—

The toothed open-ring check-piece A, having the teeth *b* and *c*, and applied to a bolt, substantially as shown and described.

JOHN JOSEPH GRAY.

Witnesses:
W. W. NORRIS.
JNO. T. MADDOX.